United States Patent
Muller et al.

(10) Patent No.: US 8,821,026 B2
(45) Date of Patent: Sep. 2, 2014

(54) DOUBLE ROLLER CAGE FOR A DOUBLE-ROW CYLINDER ROLLER BEARING WITH MASS COMPENSATION

(75) Inventors: Karl Muller, Grettstadt (DE); Werner Roman, Wurzburg (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/817,007

(22) PCT Filed: Aug. 1, 2011

(86) PCT No.: PCT/EP2011/063223
§ 371 (c)(1),
(2), (4) Date: Feb. 14, 2013

(87) PCT Pub. No.: WO2012/031831
PCT Pub. Date: Mar. 15, 2012

(65) Prior Publication Data
US 2013/0142471 A1 Jun. 6, 2013

(30) Foreign Application Priority Data
Aug. 21, 2010 (DE) .......................... 10 2010 035 061

(51) Int. Cl.
F16C 33/48 (2006.01)
F16C 33/49 (2006.01)
F16C 33/46 (2006.01)
F16C 43/06 (2006.01)
F16C 19/28 (2006.01)

(52) U.S. Cl.
CPC ............... *F16C 33/46* (2013.01); *F16C 33/494* (2013.01); *F16C 33/49* (2013.01); *F16C 43/06* (2013.01); *F16C 33/48* (2013.01); *F16C 33/467* (2013.01); *F16C 19/28* (2013.01)

USPC ........................................................ 384/572

(58) Field of Classification Search
CPC ........ F16C 33/49; F16C 19/28; F16C 33/467; F16C 33/48; F16C 33/497; F16C 33/494
USPC ................. 384/523, 527, 531, 560, 572, 573, 384/575–585, 604, 623
See application file for complete search history.

(56) References Cited

U.S. PATENT DOCUMENTS

| | | | | |
|---|---|---|---|---|
| 2,375,145 | A * | 5/1945 | Styri | 384/577 |
| 2,611,670 | A * | 9/1952 | Palmgren | 384/577 |
| 5,582,483 | A * | 12/1996 | Grunze et al. | 384/572 |
| 7,530,743 | B2 * | 5/2009 | Yakura et al. | 384/572 |
| 8,454,240 | B2 * | 6/2013 | Doyer et al. | 384/470 |
| 8,579,516 | B2 * | 11/2013 | Muhamad | 384/577 |

FOREIGN PATENT DOCUMENTS

| | | |
|---|---|---|
| DE | 2922361 | 12/1980 |
| DE | 102004043374 | 3/2006 |

(Continued)

*Primary Examiner* — Thomas R Hannon
*Assistant Examiner* — Adam D Rogers
(74) *Attorney, Agent, or Firm* — Volpe and Koenig, P.C.

(57) ABSTRACT

A double roller cage for a double-row cylinder roller bearing, with a central ring part (1) from which webs (2, 3) protrude axially on both sides, wherein the webs (2; 3) of one side in each case form a row of bearings (4; 5) together with the rolling bodies arranged therein, wherein every two adjacent webs (2; 3) of a row of bearings (4; 5) delimit a receiving pocket (6; 7) for a rolling body, and in which, at least in one row of bearings (5), the webs (3) are designed so as to taper in the circumferential direction for a radial filling of the receiving pockets (7) with the rolling bearings. So that the double roller cage has satisfactory running behavior and is relatively simple and cost-effective to produce, recesses (12, 12', 13, 14, 16) are formed on the other of the two rows of bearings (4; 5) in order to produce a symmetrical mass distribution between the two rows of bearings (4; 5).

6 Claims, 1 Drawing Sheet

(56) References Cited

FOREIGN PATENT DOCUMENTS

| | | |
|---|---|---|
| DE | 60021830 | 6/2006 |
| DE | 102008060320 | 6/2010 |
| GB | 733521 | 7/1955 |
| JP | 8184319 | 7/1996 |
| JP | 2001208075 | 8/2001 |
| WO | WO 2009040390 A1 * | 4/2009 |

* cited by examiner

DOUBLE ROLLER CAGE FOR A DOUBLE-ROW CYLINDER ROLLER BEARING WITH MASS COMPENSATION

FIELD OF THE INVENTION

The invention relates to a double roller cage for a double-row cylinder roller bearing comprising a central ring part, from which webs protrude axially on both sides, with the webs of one side in each case form a row of bearings, with every two adjacent webs of a row of bearings delimit a receiving pocket for a rolling body, and with at least in one row of bearings the webs are designed such as to taper in the circumferential direction for a radial filling of the receiving pockets with the roller bodies.

BACKGROUND

Cylinder roller bearings with several rows are known in prior art. For example they are used in larger vehicle transmissions, in drives of machinery, or in machine tools, such as support rollers in mills, in which the roller bearings are subject to high radial and, if applicable, also axial loads and/or high rotation. In such bearings two or more rows of roller bodies are arranged between an external ring and an internal ring, which may be embodied with or without ledges for fastening and guiding the rows of bearings. The cylinder rollers are usually received and held spaced apart in cages with comb-like webs projecting from a central part unilaterally or at both sides in the axial direction. Depending on the bearing design and the number of rows of bearings, a cage arrangement may also be embodied as single or double roller cages, if applicable also as a combination of several such cages. Frequently, double-row cylinder roller bearings are provided with a roller-guided double web cage made from brass.

DE 29 22 361 A1 shows a double-row cylinder roller bearing with an external ring and an internal ring, between which two window cages are arranged, one cage for each row of bearings. The cages respectively comprise an axially external comb part with webs and an axially internal cap part with centering cams. During assembly first the two cap parts are placed onto a double sided internal ledge of the internal ring provided with webs at all sides to guide and fasten the roller bodies. Subsequently the rollers of both rows of bearings are filled in as well as arranged with the help of centering cams at a required distance. Subsequently the web parts are inserted axially from the outside between the rollers. In the assembled state the two window cages form a two-part symmetric double web cage.

DE 600 21 830 T2 discloses a one-part double web cage for a double-row cylinder roller bearing, in which webs axially project from a central ring part at both sides, off-set in reference to each other. In order to reduce the risk of tears and breaks, particularly at the connection sites between the webs and the ring part, which can develop by high bending stress due to radially transferred vibrations or abrupt acceleration and braking of the roller bearing, the cage construction is designed such that it fulfills certain bending specifications. Accordingly, the bending stress of the webs and the ring part shall be approximately equivalent. The cage is embodied geometrically identical at both rows of bearings.

JP 2001 208 075 A also shows a double web cage for a double-row cylinder roller bearing. The ring part and the webs show bore holes, with the bore holes in the webs being identical for both rows of bearings.

DE 10 2008 060 320 A1 shows another double web cage. In this cage the webs are enlarged at their radially inside base, starting from the outside towards the inside to a ring part. This yields an increased stability of the cage and particularly the risk for the web bases breaking is reduced during assembly and operation. The enlargements of the webs are embodied identically at both rows of bearings.

All of the above-mentioned double roller cages show a symmetrical web design between the two rows of bearings. Sometimes the assembly of double cylinder roller bearings with a unilateral double web cage in an efficient production process and during installation into the respective application seems relatively difficult, though, with regards to the assembly of the roller bodies. In particular in metallic double roller cages made from brass, for example, with exterior ledges for guiding and fastening the rows of bearings, the equipping of the bearing with the roller bodies occurs frequently axially and radially. In a first step the cylinder rolls of a first row of bearings are axially pushed into the cage, with for this purpose the cage being positioned axially offset in a bearing ring and the rollers are then inserted via an external ledge axially into the receiving pockets. Due to the fact that the cage is axially fixed by the assembly of the first row of bearings, the rollers of the second row of bearings cannot be inserted via the external ledge of the bearing ring but only from the top, i.e. inserted into the cage pockets in the radial direction. For this purpose, the webs of the second row of bearings can be appropriately narrowed in the circumferential direction such that the radial roller assembly is possible and simultaneously guidance and the secure fastening against falling out after the assembly are given.

From the consequently differently wide webs of the two rows of bearings an asymmetrical mass distribution results in the roller bearing which may lead to unfavorable kinematic features of the cylinder roller bearing. In particular, during operation with increasing rotations the roller bearing may tend to an asymmetrical and/or tilted positioning of the double roller cage, which may result in the running performance of the roller bodies being seriously disturbed.

In light of this background a cylinder roller bearing is known from JP 8 184 319 A with a double roller cage shows an asymmetrical mass distribution of two rows of bearings, in which an embodiment for facilitated assembly is provided. The cylinder roller bearing comprises an internal ring without a ledge and an external ring with external ledges and a central ledge. An axially aligned assembly groove is formed at one of the two external ledges for the axial insertion of the rollers of the corresponding row of bearings. The external ends of the webs of this row extend in a tapered fashion, being diagonally cut at one side radially inwardly. This way the receiving pockets are expanded such that the rollers can be inserted in a relatively easy fashion axially from the outside in an angular assembly position via the external ledge into the receiving pockets. Although the webs are not narrowed at this cage side to allow being equipped from the top; however, by the diagonal shape of the webs of one row of bearings and the assembly groove on this cage side an asymmetric mass distribution is given with the above-described negative consequences.

SUMMARY

The invention is based on the objective of providing a double roller cage for a double-row cylinder roller bearing, which avoids the above-mentioned disadvantages. In particular, it shall be possible to equip the double roller cage with roller bodies from the top and still show a flawless running behavior and be easily and cost-effectively produced.

The invention is based on the acknowledgement that in a double roller cage, in a double-row cylinder roller bearing, a disturbed running behavior due to webs narrowed for reasons of assembly at one of the two rows of bearings as well as an uneven mass distribution caused thereby can be avoided by simple and cost-effective measures in the area of the other row of bearings, compensating this unilateral mass reduction.

The invention therefore is based on a double roller cage for a double-row cylinder roller bearing with a central ring part, from which webs axially project at both sides, with the webs of one side form one row of bearings together with the roller bodies arranged there, with each two adjacent webs of a row of bearings delimiting a receiving pocket for a roller body, and with at least in one row of bearings the webs are embodied narrowed in the circumferential direction for a radial equipping of the receiving pocket with the roller bodies. In order to attain the objective according to the invention it is provided that recesses are embodied at the other row of bearings to produce a symmetric mass distribution between the two rows of bearings.

In the following, the width of a web is considered the width of a radially external base of the web in the circumferential direction. If this width varies in the axial direction, contrary to conventional embodiments showing a constant web width, here the web width is considered a relevant measure for radial equipment with roller bodies showing a radially external base being considered the width of the webs in the circumferential direction.

Accordingly, a double web cage, in which a row of bearings radially to be equipped is provided with narrower webs in order to implement mass compensation between the two rows of bearings such that both rows of bearings show an identical or at least almost identical weight, as a first measure is embodied with sufficiently large axial bores in the wider webs of the other row of bearings.

Additionally, the receiving pockets of the row of bearings with the wider webs may be embodied with appropriately deeper bore holes and/or with recesses at the base. It is also possible to form grooves in the area of the webs in the rows of bearings with wider webs. Furthermore, it may be provided that perhaps centering bores of the receiving pockets may be drilled out appropriately deeper in the row of bearings with the wider bars.

Preferably the recesses are formed at the row of bearings with the wider webs at all webs and/or at all receiving pockets. However, in general it is also possible that these measures, evenly distributed over the circumference, are only embodied at some of the webs and/or receiving pockets, for example at every other web.

By the above-mentioned measures according to the invention for a double roller cage for double-row cylinder roller bearings with webs unilaterally narrowed for reasons of assembly a symmetric mass distribution of the two sides of the cage and/or rows of bearings is achieved and thus a kinematically disturbed running behavior of the cage is prevented.

The recesses may be embodied as individual measures or formed in a combination at the respective row of bearings. In general, the invention comprises all recesses reducing the mass in the area of those rows of bearings, which do not mandatorily need to be filled radially, yet are suitable to allow the mass distribution symmetrically at both sides of the cage.

Accordingly, recesses are also considered here that (alternative to bore holes, grooves, etc.) at the wider webs, the webs of both rows of bearings may be embodied geometrically identical here, i.e. that the webs of both rows of bearings are embodied equally narrowed from the top for the radial roller assembly, regardless if also the first row of bearings is filled in practice or filled axially as in prior art. Depending on the requirements and loads here sufficiently stable roller guidance must be considered, though.

The invention can be applied beneficially for all double roller cages for double-row cylinder roller bearings, in which unilaterally the web widths shall be adjusted for a roller assembly from radial directions. Due to the fact that this construction and/or type of assembly is particularly relevant for cages made from brass or materials with similar features a construction according to the invention can particularly yield an advantageous symmetric running behavior in such cages.

In general it is also possible to produce the double roller cage not uniformly from the same material but to produce two web-cages with the required different web widths and/or unilaterally reduced web widths from materials of different masses, which compensate the geometric inequality and subsequently assemble the sides such that here a symmetric mass distribution of the double roller cage develops. However, here the expenses for costs and construction must be considered. This option is therefore not discussed in further detail.

BRIEF DESCRIPTION OF THE DRAWINGS

In the following the invention is explained in greater detail based on some embodiments shown in the attached drawings. Here shown are.

DETAILED DESCRIPTION OF THE PREFERRED EMBODIMENTS

Figure 1:
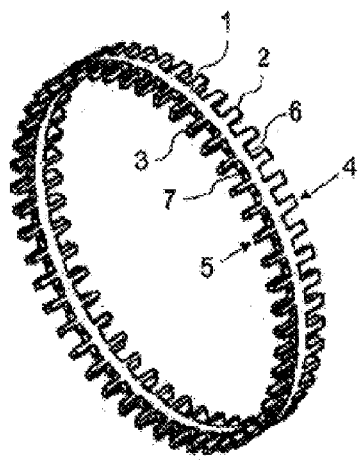
FIG. 1 a double roller cage for a double-row cylinder roller bearing in a perspective view, FIG. 2 an enlarged detail of the circumferential view of the double roller cage according to FIG. 1 with schematically shown recesses according to the invention, and FIG. 3 an enlarged detail of the double roller cage as a top view of FIG. 1 with schematically shown recesses according to the invention.
Figure 2:
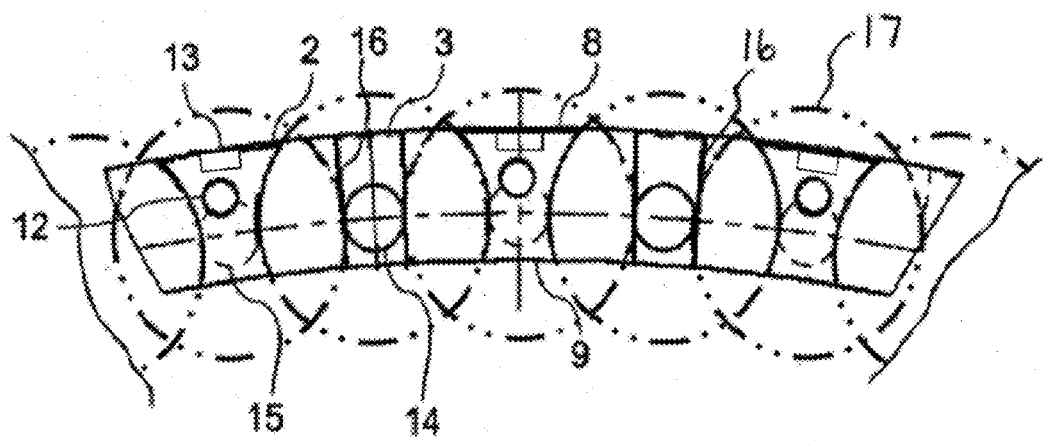

The double roller cage shown in FIG. 1, for example produced in one piece from brass and assembled to form a ring for a double-row cylinder roller bearing comprises a central ring part 1, with webs 2, 3 axially projecting at both sides, offset in reference to each other. The webs 2, 3 of the two axial sides of the cage are arranged evenly distributed over the circumference and respectively form a row of bearings 4, 5 with roller bodies and/or cylinder rollers 17 (represented in phantom lines in FIG. 2). Two neighboring webs 2 and/or 3 each form a receiving pocket 6 and/or 7 for a cylinder roller. For fastening and supporting the cylinder rollers in the receiving pockets 6, 7, as indicated in FIG. 2, the webs 2, 3 may be contoured between a radially external base 8 and a radially internal base 9 in a manner known per se. External and internal rings of the cylinder roller bearing, not shown, are also embodied in a manner known per se and thus not described in further detail.

In the circumferential direction the webs 2, 3 have a width 10, 11 of their radially external base 8 (FIGS. 2 and 3), which is different at the two rows of bearings 4, 5. While the webs 2 of one row of bearings 4 are embodied with a width 10, which allows only the assembly of one roller body in the axial direction, thus from the side, the bars 3 of the other row of bearings 5 show a narrower width 11 in reference thereto, which also allows a roller body assembly from the radial direction, thus from the top, due to the appropriately wider receiving pockets 7. In the radial direction the web width 10, 11 of both rows of bearings 4, 5 are constant.

The assembly occurs in two steps. First, the double roller cage is positioned axially offset in the cylinder roller bearing. The cylinder rollers are inserted axially, if applicable via an external ledge of the external or internal ring into the narrow receiving pockets 6 of the row of bearings 4 with the wider webs 2. By the assembled first row of bearings 4, the axial position of the double roller cage is determined in the roller bearing. In the second step the second row of bearings 5 is radially equipped with cylinder rollers from the top, with the cylinder rollers being inserted into the respective receiving pockets 7.

Figure 3:
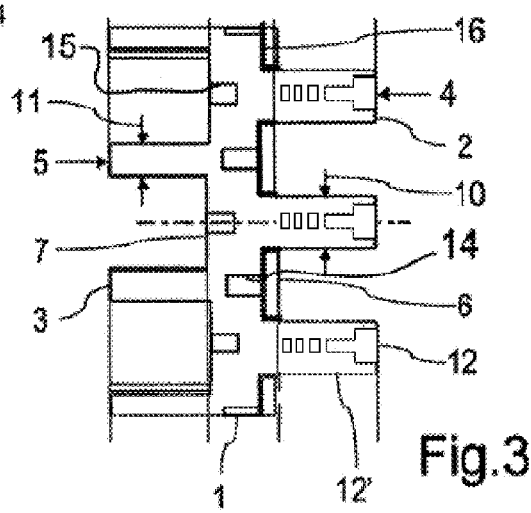

In order to compensate the mass inequality between the two rows of bearings 4, 5 due to the differently wide webs 2, 3, at the wider webs 2 recesses are provided in the form of axial bores 12, 12' and/or grooves 13. These recesses 12, 12', 13 are schematically shown in FIG. 2 and/or FIG. 3. At the ring part 1 the receiving pockets 6 limited by the wider webs 2 comprise a bottom pocket recess 16 (FIG. 3). Furthermore, centering bores 14, 15 are embodied in the receiving pockets 6, 7, with the centering bores 14 at the row of bearings 4 with wider webs are embodied deeper (FIG. 2). The recesses 12, 12', 13, 14, 16 shall be understood as measures implemented individually or in a combination such that a symmetrical mass distribution is achieved between the two rows of bearings 4, 5.

LIST OF REFERENCE CHARACTERS

1 ring part
2 web
3 web
4 row of bearings
5 row of bearings
6 receiving pocket
7 receiving pocket
8 base
9 base
10 web width
11 web width
12, 12' recess, axial bore
13 recess, groove
14 recess, centering bore
15 centering bore
16 recess, pocket recess

The invention claimed is:

1. A double roller cage for a double-row cylinder roller bearing comprising a central ring part, from which a first plurality of webs protrude from one side of the central ring part and a second plurality of webs protrude from another side of the central ring part, the first plurality of webs forms a first row of receiving pockets and the second plurality of webs forms a second row of receiving pockets, and the first and second rows of receiving pockets are adapted to receive roller bodies therein to define first and second rows of bearings, adjacent webs of the first and second rows of bearings define each of the receiving pockets for respective ones of the roller bodies, and at least one of the first and second plurality of webs includes tapered surfaces in a circumferential direction for radially retaining the roller bodies, and the first plurality of webs are wider than the second plurality of webs, and the first plurality of webs include bores on axial end faces such that weights of the first and second rows of bearings are adjusted to each other.

2. A double roller cage according to claim 1, wherein both of the first and second plurality of webs comprise the tapered surfaces for radial retention of the roller bodies.

3. A double roller cage according to claim 1, wherein the double roller cage is produced from brass.

4. A double roller cage for a double-row cylinder roller bearing comprising a central ring part, from which a first plurality of webs protrude from one side of the central ring part and a second plurality of webs protrude from another side of the central ring part, the first plurality of webs forms a first row of receiving pockets and the second plurality of webs forms a second row of receiving pockets, and the first and second rows of receiving pockets are adapted to receive roller bodies therein to define first and second rows of bearings, adjacent webs of the first and second rows of bearings define each of the receiving pockets for respective ones of the roller bodies, and at least one of the first and second plurality of webs includes tapered surfaces in a circumferential direction for radially retaining the roller bodies, wherein the first plurality of webs are wider than the second plurality of webs, and the first plurality of webs include grooves such that weights of the first and second rows of bearings are adjusted to each other.

5. A double roller cage for a double-row cylinder roller bearing comprising a central ring part, from which a first plurality of webs protrude from one side of the central ring part and a second plurality of webs protrude from another side of the central ring part, the first plurality of webs forms a first row of receiving pockets and the second plurality of webs forms a second row of receiving pockets, and the first and second rows of receiving pockets are adapted to receive roller bodies therein to define first and second rows of bearings, adjacent webs of the first and second rows of bearings define each of the receiving pockets for respective ones of the roller bodies, and at least one of the first and second plurality of webs includes tapered surfaces in a circumferential direction for radially retaining the roller bodies, wherein the first plurality of webs are wider than the second plurality of webs, and receiving pockets of the first plurality of webs include recesses at the central ring part such that weights of the first and second rows of bearings are adjusted to each other.

6. A double roller cage for a double-row cylinder roller bearing comprising a central ring part, from which a first plurality of webs protrude from one side of the central ring part and a second plurality of webs protrude from another side of the central ring part, the first plurality of webs forms a first row of receiving pockets and the second plurality of webs forms a second row of receiving pockets, and the first and second rows of receiving pockets are adapted to receive roller bodies therein to define first and second rows of bearings, adjacent webs of the first and second rows of bearings define each of the receiving pockets for respective ones of the roller bodies, and at least one of the first and second plurality of webs includes tapered surfaces in a circumferential direction for radially retaining the roller bodies, wherein receiving pockets of the first and second rows of bearings comprise centering bores at the central ring part, the first plurality of webs are wider than the second plurality of webs, and the centering bores in the first row of bearings are deeper than the centering bores in the second row of bearings such that weights of the first and second rows of bearings are adjusted to each other.

\* \* \* \* \*